US012488338B2

(12) United States Patent
Dahn et al.

(10) Patent No.: US 12,488,338 B2
(45) Date of Patent: Dec. 2, 2025

(54) OFFLINE MODE FOR DISTRIBUTION OF ENCRYPTION KEYS

(71) Applicant: Stripe, Inc., South San Francisco, CA (US)

(72) Inventors: Michael David Dahn, San Francisco, CA (US); Bryan Daniel Berg, Seattle, WA (US)

(73) Assignee: Stripe, Inc., South San Francisco, CA (US)

( * ) Notice: Subject to any disclaimer, the term of this patent is extended or adjusted under 35 U.S.C. 154(b) by 0 days.

(21) Appl. No.: 18/444,568

(22) Filed: Feb. 16, 2024

(65) Prior Publication Data

US 2024/0193595 A1 Jun. 13, 2024

Related U.S. Application Data

(63) Continuation of application No. 17/302,447, filed on May 3, 2021, now Pat. No. 11,935,040, which is a continuation of application No. 15/789,619, filed on Oct. 20, 2017, now abandoned.

(51) Int. Cl.
*G06Q 20/38* (2012.01)

(52) U.S. Cl.
CPC ..... *G06Q 20/3829* (2013.01); *G06Q 2220/10* (2013.01)

(58) Field of Classification Search
CPC .......... G06Q 20/3829; G06Q 2220/10; G06Q 20/38215; H04L 9/0825; H04L 9/0819
See application file for complete search history.

(56) References Cited

U.S. PATENT DOCUMENTS

| | | | |
|---|---|---|---|
| 6,192,131 B1 | 2/2001 | Geer, Jr. et al. | |
| 9,571,471 B1* | 2/2017 | Kupreev | H04L 67/02 |
| 9,830,596 B2 | 11/2017 | Collison et al. | |
| 10,049,349 B1* | 8/2018 | Grassadonia | G06Q 20/40 |
| 2009/0006250 A1 | 1/2009 | Bixier | |
| 2011/0161233 A1* | 6/2011 | Tieken | G06Q 20/40 705/76 |
| 2012/0197807 A1* | 8/2012 | Schlesser | G06Q 20/3829 705/71 |
| 2013/0117185 A1* | 5/2013 | Collison | G06Q 20/3829 705/67 |
| 2013/0212024 A1 | 8/2013 | Mattson | |
| 2013/0212378 A1* | 8/2013 | Falk | H04L 63/0428 713/155 |
| 2014/0040144 A1 | 2/2014 | Plomske | |
| 2014/0289118 A1 | 9/2014 | Kassemi | |
| 2015/0019443 A1 | 1/2015 | Sheets | |

(Continued)

OTHER PUBLICATIONS

Danushka Jayasinghe et al., Extending EMV Tokenised Payments to Offline-Environments, 2016, IEEE, pp. 443-450 (Year: 2016).*

(Continued)

*Primary Examiner* — Nilesh B Khatri
(74) *Attorney, Agent, or Firm* — BAKERHOSTETLER

(57) ABSTRACT

The subject technology enables encryption key distribution when a processor is in offline mode. When offline, key distribution servers can distribute private/public key pairs in place of the processor. The servers can distribute a public key to a user device for encryption of data. The encrypted data can be provided to the processor, which can return a token in response to provide to the first server.

20 Claims, 9 Drawing Sheets

(56) References Cited

U.S. PATENT DOCUMENTS

| | | | |
|---|---|---|---|
| 2015/0088756 A1 | 3/2015 | Makhotin | |
| 2015/0142673 A1* | 5/2015 | Nelsen | G06Q 20/405 705/76 |
| 2015/0310431 A1 | 10/2015 | Lakshmanan | |
| 2015/0339664 A1 | 11/2015 | Wong | |
| 2016/0110718 A1* | 4/2016 | Jajara | G06Q 20/4016 705/44 |
| 2016/0140548 A1 | 5/2016 | Ahn | |
| 2016/0364777 A1 | 12/2016 | Josefiak | |
| 2016/0381010 A1* | 12/2016 | Bhandari | H04W 12/041 713/171 |
| 2017/0161733 A1 | 6/2017 | Koletsky | |
| 2018/0047016 A1* | 2/2018 | Sarin | G06Q 20/3674 |
| 2020/0052905 A1 | 2/2020 | Mathias | |

OTHER PUBLICATIONS

Bazeem Ismaeil Khan et al., Secure Device for Offline Micro Payment, Mar. 2017, International Journal of Emerging Technology in Computer Science & Electronics, pp. 33-37 (Year: 2017).*
Chou, "Inside SSL: The Secure Sockets Layer Protocol," Dec. 2002, IEEE, pp. 47-52.
Advisory Action from U.S. Appl. No. 15/789,619, dated Feb. 1, 2021, 3 pages.
Advisory Action from U.S. Appl. No. 15/789,619, dated Mar. 18, 2019, 3 pages.
Advisory Action from U.S. Appl. No. 15/789,619, dated Dec. 14, 2020, 3 pages.
Examiner Interview Summary from U.S. Appl. No. 15/789,619, dated Nov. 22, 2019, 3 pages.
Final Office Action from U.S. Appl. No. 15/789,619, dated Aug. 8, 2019, 10 pages.
Final Office Action from U.S. Appl. No. 15/789,619, dated Oct. 5, 2020, 11 pages.
Final Office Action from U.S. Appl. No. 15/789,619, dated Nov. 30, 2018, 10 pages.
Non-Final Office Action from U.S. Appl. No. 15/789,619, dated May 9, 2018, 9 pages.
Non-Final Office Action from U.S. Appl. No. 15/789,619, dated Jun. 9, 2020, 12 pages.
Non-Final Office Action from U.S. Appl. No. 15/789,619, dated Jun. 14, 2019, 7 pages.
Non-Final Office Action from U.S. Appl. No. 15/789,619, dated Dec. 2, 2019, 9 pages.
Response from U.S. Appl. No. 15/789,619, filed Feb. 24, 2020, 9 pages.
Response from U.S. Appl. No. 15/789,619, filed Jul. 2, 2019, 10 pages.
Response from U.S. Appl. No. 15/789,619, filed Aug. 27, 2020, 9 pages.
Response from U.S. Appl. No. 15/789,619, filed Jan. 30, 2019, 16 pages.
Response from U.S. Appl. No. 15/789,619, filed Oct. 4, 2019, 11 pages.
Response from U.S. Appl. No. 15/789,619, filed Nov. 30, 2020, 9 pages.
Response from U.S. Appl. No. 15/789,619, filed Dec. 28, 2020, 10 pages.
Response from U.S. Appl. No. 15/789,619, filed Apr. 9, 2019, 12 pages.

* cited by examiner

OFFLINE MODE FOR DISTRIBUTION OF ENCRYPTION KEYS

CROSS-REFERENCE TO RELATED APPLICATIONS

This application is a continuation of and incorporates by reference U.S. patent application Ser. No. 17/302,447, filed May 3, 2021, which in turn is a continuation of U.S. patent application Ser. No. 15/789,619, filed Oct. 20, 2017.

TECHNICAL FIELD

The subject matter disclosed herein generally relates to the technical field of special-purpose machines that distribute encryption keys when a server is offline.

BACKGROUND

The present subject matter seeks to address technical problems existing in conventional payment processors. For example, while payment processors (for example Stripe, Inc., hereinafter "Stripe") seek to provide global, round-the-clock uptime and availability, the reality is that there are occasionally periods ranging from seconds to minutes when technical problems exist, such as service interruptions. Such interruptions can be caused for example by the service itself, or by network connectivity issues (e.g., DNS routing problems, server crash, malware, etc.), or because of the temporary unavailability of a third party upon which the payment processor relies. For online or standard retail merchants using payment processors, this offline period can be problematic because they are generally unable to accept any payments due to lack of encryption keys, resulting in potential lost sales or customer frustration.

BRIEF DESCRIPTION OF THE DRAWINGS

Some embodiments are illustrated by way of example and not limitation in the figures of the accompanying drawings. In order to identify more easily the discussion of any particular element or act, the most significant digit or digits in a reference number refer to the figure number in which that element is first introduced.

DETAILED DESCRIPTION

Figure 1:
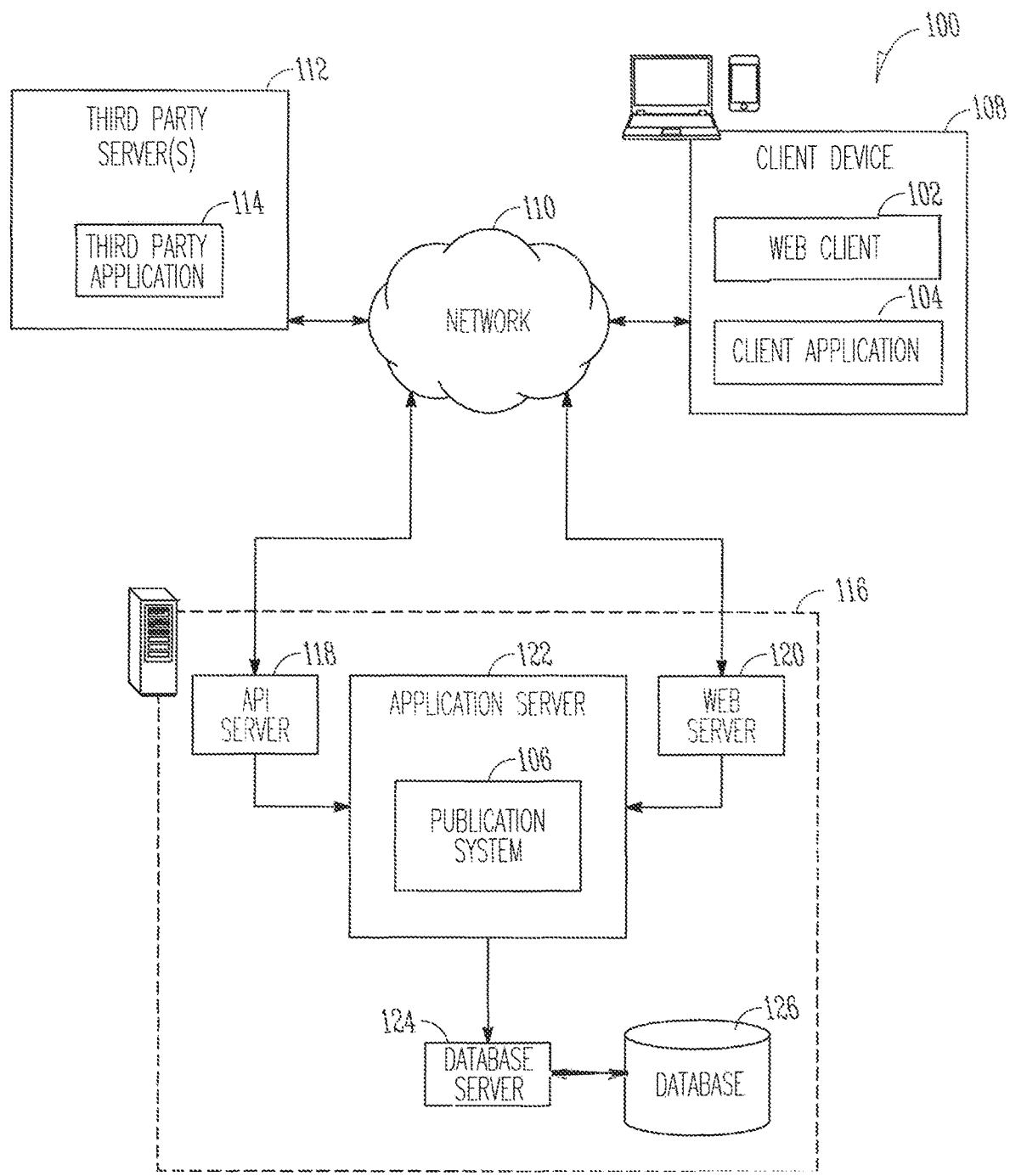
FIG. 1 is a block diagram illustrating a networked system, according to an example embodiment.

"Carrier Signal" in this context refers to any intangible medium that is capable of storing, encoding, or carrying instructions for execution by the machine, and includes digital or analog communications signals or other intangible medium to facilitate communication of such instructions. Instructions may be transmitted or received over the network using a transmission medium via a network interface device and using any one of a number of well-known transfer protocols.

"Client Device" or "Electronic Device" in this context refers to any machine that interfaces to a communications network to obtain resources from one or more server systems or other client devices. A client device may be, but is not limited to, a mobile phone, desktop computer, laptop, portable digital assistants (PDAs), smart phones, tablets, ultra-books, netbooks, laptops, multi-processor systems, microprocessor-based or programmable consumer electronics, game consoles, set-top boxes, or any other communication device that a user may use to access a network.

"Customer's Electronic Device" or "Electronic User Device" in this context refers to a client device that the customer uses to interact with the merchant. Examples of this device include a desktop computer, a laptop computer, a mobile device (e.g., smartphone, tablet) and game console. The customer's electronic device may interact with the merchant via a browser application that executes on the device, or via a native app installed onto the customer's device. The client-side application executes on the customer's electronic device.

"Communications Network" in this context refers to one or more portions of a network that may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network or a portion of a network may include a wireless or cellular network and the coupling may be a Code Division Multiple Access (CDMA) connection, a Global System for Mobile communications (GSM) connection, or other type of cellular or wireless coupling. In this example, the coupling may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard setting organizations, other long range protocols, or other data transfer technology.

"Component" in this context refers to a device, physical entity, or logic having boundaries defined by function or subroutine calls, branch points, application program interfaces (APIs), or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions. Components may constitute either software components (e.g., code embodied on a machine-readable medium) or hardware components.

A "hardware component" is a tangible unit capable of performing certain operations and may be configured or arranged in a certain physical manner. In various example embodiments, one or more computer systems (e.g., a standalone computer system, a client computer system, or a server computer system) or one or more hardware components of a computer system (e.g., a processor or a group of processors) may be configured by software (e.g., an application or application portion) as a hardware component that operates to perform certain operations as described herein. A hardware component may also be implemented mechanically, electronically, or any suitable combination thereof. For example, a hardware component may include dedicated circuitry or logic that is permanently configured to perform certain operations. A hardware component may be a special-purpose processor, such as a Field-Programmable Gate Array (FPGA) or an Application Specific Integrated Circuit (ASIC). A hardware component may also include programmable logic or circuitry that is temporarily configured by software to perform certain operations. For example, a hardware component may include software executed by a general-purpose processor or other programmable processor. Once configured by such software, hardware components become specific machines (or specific components of a machine) uniquely tailored to perform the configured functions and are no longer general-purpose processors.

It will be appreciated that the decision to implement a hardware component mechanically, in dedicated and permanently configured circuitry, or in temporarily configured circuitry (e.g., configured by software) may be driven by cost and time considerations. Accordingly, the phrase "hardware component" (or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware components are temporarily configured (e.g., programmed), each of the hardware components need not be configured or instantiated at any one instance in time. For example, where a hardware component comprises a general-purpose processor configured by software to become a special-purpose processor, the general-purpose processor may be configured as respectively different special-purpose processors (e.g., comprising different hardware components) at different times. Software accordingly configures a particular processor or processors, for example, to constitute a particular hardware component at one instance of time and to constitute a different hardware component at a different instance of time. Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses) between or among two or more of the hardware components. In embodiments in which multiple hardware components are configured or instantiated at different times, communications between such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output. Hardware components may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented components that operate to perform one or more operations or functions described herein. As used herein, "processor-implemented component" refers to a hardware component implemented using one or more processors. Similarly, the methods described herein may be at least partially processor-implemented, with a particular processor or processors being an example of hardware. For example, at least some of the operations of a method may be performed by one or more processors or processor-implemented components. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an Application Program Interface (API)). The performance of certain of the operations may be distributed among the processors, not only residing within a single machine, but deployed across a number of machines. In some example embodiments, the processors or processor-implemented components may be located in a single geographic location (e.g., within a home environment, an office environment, or a server farm). In other example embodiments, the processors or processor-implemented components may be distributed across a number of geographic locations.

"Machine-Readable Medium" in this context refers to a component, device or other tangible media able to store instructions and data temporarily or permanently and may include, but not be limited to, random-access memory (RAM), read-only memory (ROM), buffer memory, flash memory, optical media, magnetic media, cache memory, other types of storage (e.g., Erasable Programmable Read-Only Memory (EEPROM)) and/or any suitable combination thereof. The term "machine-readable medium" should be taken to include a single medium or multiple media (e.g., a centralized or distributed database, or associated caches and servers) able to store instructions. The term "machine-readable medium" shall also be taken to include any medium, or combination of multiple media, that is capable of storing instructions (e.g., code) for execution by a machine, such that the instructions, when executed by one or more processors of the machine, cause the machine to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" excludes signals per se.

"Processor" in one context refers to any circuit or virtual circuit (a physical circuit emulated by logic executing on an actual processor) that manipulates data values according to control signals (e.g., "commands", "op codes", "machine code", etc.) and which produces corresponding output signals that are applied to operate a machine. A processor may, for example, be a Central Processing Unit (CPU), a Reduced Instruction Set Computing (RISC) processor, a Complex Instruction Set Computing (CISC) processor, a Graphics Processing Unit (GPU), a Digital Signal Processor (DSP), an Application Specific Integrated Circuit (ASIC), a Radio-Frequency Integrated Circuit (RFIC) or any combination thereof. A processor may further be a multi-core processor having two or more independent processors (sometimes referred to as "cores") that may execute instructions contemporaneously.

In another context, a "Processor", also referred to herein as "processor (5400 in FIG. 5)," is a company (often a third party) appointed to handle payment card transactions (e.g., credit card, debit card). They have connections to various card networks and supply authorization and settlement services to merchants or payment service providers. In aspects, they can also move the money from an issuing bank to a merchant or acquiring bank.

"Card Network" (or "Card Association") in this context refers to financial payment networks such as Visa®, MasterCard®, American Express®, Diners Club®, JCB® and China Union-Pay®.

"Acquiring Bank" or "Acquirer" in this context refers to a bank or financial institution that accepts credit and/or debit card payments from affiliated card networks for products or services on behalf of a merchant or payment service provider.

"Card Issuing Bank" in this context refers to a bank that offers card network or association branded payment cards directly to consumers. An issuing bank assumes primary liability for the consumer's capacity to pay off debts they incur with their card.

"Payment Information" includes information required to complete a transaction, and the specific type of information provided may vary by payment type. Some payment information will be sensitive (e.g., the card validation code) while other information might not be (e.g., zip code). For example, when making payment via a credit card or debit card, the payment information includes primary account number (PAN) or credit card number, card validation code, expiration month, and year. In another payment example, for instance made using an Automated Clearinghouse (ACH) transaction, the payment information includes a bank routing number and an account number within that bank.

"Sensitive information" may not necessarily be related to payment information and may include other confidential personal information, such as medical (HIPAA) information, for example. The ambit of the term "Payment Information" includes "Sensitive Information" within its scope. In some examples, sensitive payment information may include "regulated payment information", which may change over time. For example, currently a merchant cannot collect more than the first six (6) or the last four (4) numbers of a customer's PAN without generally needing to comply with Payment Card Industry (PCI) regulations. But card lengths may change, and when they do the "6 and 4" rules will likely change with them. These potential future changes are incorporated within the ambit of "regulated payment information" which is in turn included within the ambit of the term "payment information" as defined herein.

"Merchant" in this context refers to an entity that is associated with selling or licensing products and/or services over electronic systems such as the Internet and other computer networks. The merchant may be the direct seller/licensor, or the merchant may be an agent for a direct seller/licensor. For example, entities such as Amazon® sometimes act as the direct seller/licensor, and sometimes act as an agent for a direct seller/licensor.

"Merchant Site" in this context refers to an e-commerce site or portal (e.g., website, or mobile app) of the merchant. The merchant (100) and merchant server (120) in some figures are associated with the merchant site. The merchant site is associated with a client-side (client side) application and a server-side (server side) application. In one example embodiment, the merchant site includes the Merchant Server (120 in FIG. 5), and the server-side application executes on the Merchant Server (120).

"Payment Processor" in this context (e.g., Payment Processor, 5300 in FIG. 5) refers to an entity or a plurality of entities that facilitate a transaction between a merchant site and a customer's electronic device. With reference to a high-level description illustrated in FIG. 5, in some examples described more fully below, the payment processor includes selected functionality of both Stripe (5300) and Processor (5400)/Card Networks (5500). For example, Stripe (5300) creates tokens and maintains and verifies publishable (non-secret) keys and secret keys. In the illustrated example, the Processor (5400)/Card Networks (5500) is involved in authorizing or validating payment information. In one example embodiment, Stripe (5300) and the Processor (5400)/Card Networks (5500) function together to authorize and validate payment information, issue a token, and settle any charges that are made. Accordingly, in this embodiment, the payment processor refers to the functionality of Stripe (5300) and the functionality of the Processor (5400)/Card Networks (5500). In another example embodiment wherein step (3) in the high-level description is not performed, and Stripe (5300) performs its own verification before issuing a token, the Processor (5400)/Card Networks (5500) are still used for settling any charges that are made, as described in step (7) in the high-level description. Accordingly, in this embodiment, the payment processor may refer only to the functionality of Stripe (50) with respect to issuing tokens. Further, in the example arrangement shown, Payment Processor (5300), Processor (5400), and the Card Networks (5500) are shown as separate entities. In some examples, their respective functions may be performed by two entities, or even just one entity, with the entities themselves being configured accordingly.

"Native Application" or "native app" in this context refers to an app commonly used with a mobile device, such as a smartphone or tablet. When used with a mobile device, the native app is installed directly onto the mobile device. Mobile device users typically obtain these apps through an online store or marketplace, such as an app store (e.g., Apple's App Store, Google Play store). More generically, a native application is designed to run in the computer environment (machine language and operating system) that it is being run in. It can be referred to as a locally installed application. A native application differs from an interpreted application, such as a Java applet, which requires interpreter software. A native application also differs from an emulated application that is written for a different platform and converted in real time to run, and also differs from a Web application that is run within the browser.

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever. The following notice applies to the software and data as described below and in the drawings form a part of this document: Copyright 2011-2017, Stripe, Inc., All Rights Reserved.

The description that follows includes systems, methods, techniques, instruction sequences, and computing machine program products that embody illustrative embodiments of the disclosure. In the following description, for the purposes of explanation, numerous specific details are set forth in order to provide an understanding of various embodiments of the inventive subject matter. It will be evident, however, to those skilled in the art, that embodiments of the inventive subject matter may be practiced without these specific details. In general, well-known instruction instances, protocols, structures, and techniques are not necessarily shown in detail.

With reference to FIG. 1, an example embodiment of a high-level SaaS network architecture 100 is shown. A networked system 116 provides server-side functionality via a network 110 (e.g., the Internet or wide area network (WAN)) to a client device 108. A web client 102 and a programmatic client, in the example form of a client application 104, are hosted and execute on the client device 108. The networked system 116 includes an application server 122, which in turn hosts a publication system 106 (such as the publication system hosted at https://stripe.com by Stripe, Inc. of San Francisco, CA (herein "Stripe", as an example of a payment processor)) that provides a number of functions and services to the application 104 that accesses the networked system 116. The application 104 also provides a number of interfaces described herein, which present output of the scheduling operations to a user of the client device 108.

The client device 108 enables a user to access and interact with the networked system 116, and ultimately the publication system 106. For instance, the user provides input (e.g., touch screen input or alphanumeric input) to the client device 108, and the input is communicated to the networked system 116 via the network 110. In this instance, the networked system 116, in response to receiving the input from the user, communicates information back to the client device 108 via the network 110 to be presented to the user.

An Application Program Interface (API) server 118 and a web server 120 are coupled, and provide programmatic and web interfaces respectively, to the application server 122. The application server 122 hosts the publication system 106, which includes components or applications described further below. The application server 122 is, in turn, shown to be coupled to a database server 124 that facilitates access to information storage repositories (e.g., a database 126). In an example embodiment, the database 126 includes storage devices that store information accessed and generated by the publication system 106.

Additionally, a third-party application 114, executing on a third-party server(s) 112, is shown as having programmatic access to the networked system 116 via the programmatic interface provided by the Application Program Interface (API) server 118. For example, the third-party application 114, using information retrieved from the networked system 116, may support one or more features or functions on a website hosted by the third party.

Turning now specifically to the applications hosted by the client device 108, the web client 102 may access the various systems (e.g., publication system 106) via the web interface supported by the web server 120. Similarly, the application 104 (e.g., an "app" such as a Stripe, Inc. app) accesses the various services and functions provided by the publication system 106 via the programmatic interface provided by the Application Program Interface (API) server 118. The application 104 may be, for example, an "app" executing on a client device 108, such as an iOS or Android OS application to enable a user to access and input data on the networked system 116 in an off-line manner, and to perform batch-mode communications between the programmatic client application 104 and the networked system networked system 116.

Further, while the SaaS network architecture 100 shown in FIG. 1 employs a client-server architecture, the present inventive subject matter is of course not limited to such an architecture, and could equally well find application in a distributed, or peer-to-peer, architecture system, for example. The publication system 106 could also be implemented as a standalone software program, which does not necessarily have networking capabilities.

Figure 2:
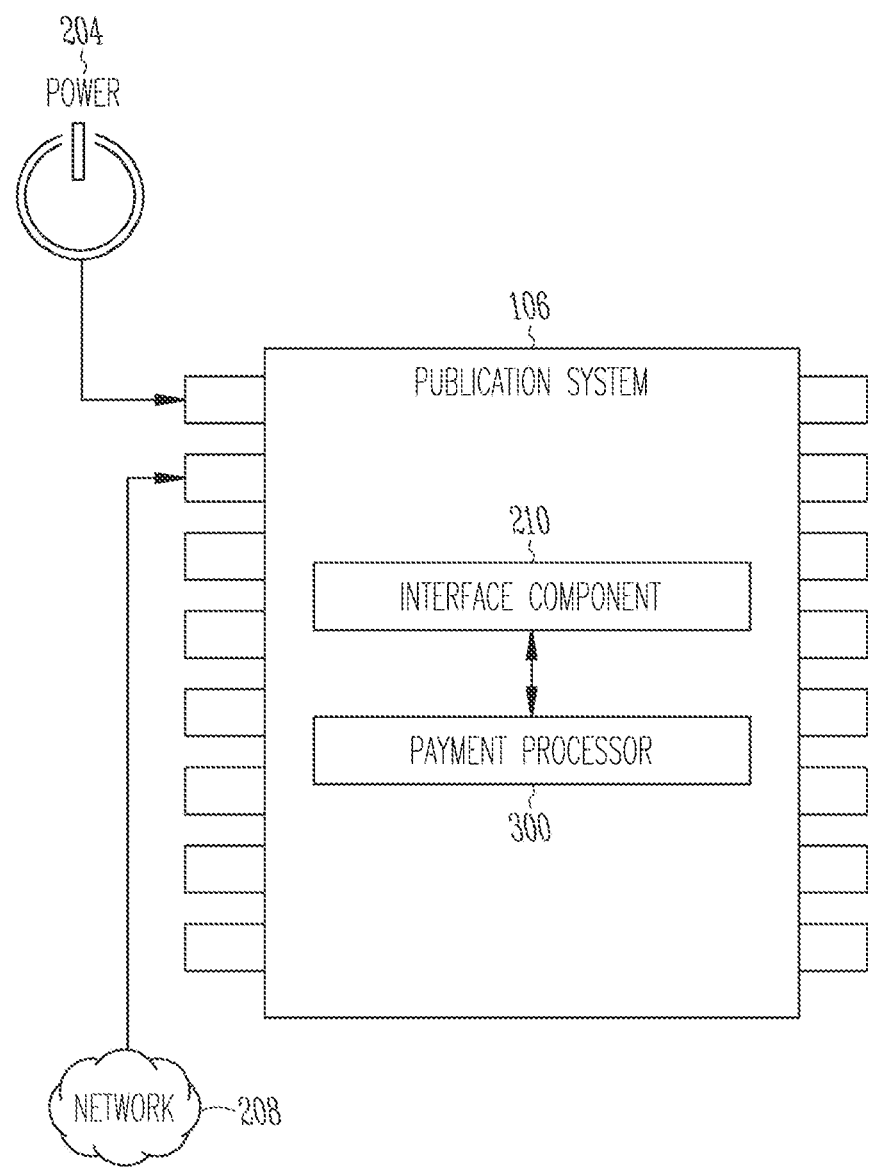
FIG. 2 is a block diagram showing architectural aspects of a networked system, according to some example embodiments.

FIG. 2 is a block diagram showing architectural details of a publication system 106, according to some example embodiments. Specifically, the publication system 106 is shown to include an interface component 210 by which the publication system 106 communicates (e.g., over the network 208) with other systems within the SaaS network architecture 100.

The interface component 210 is communicatively coupled to a payment processor 300 that operates to provide call center payment functionality in accordance with the methods described herein with reference to the accompanying drawings.

Figure 3:
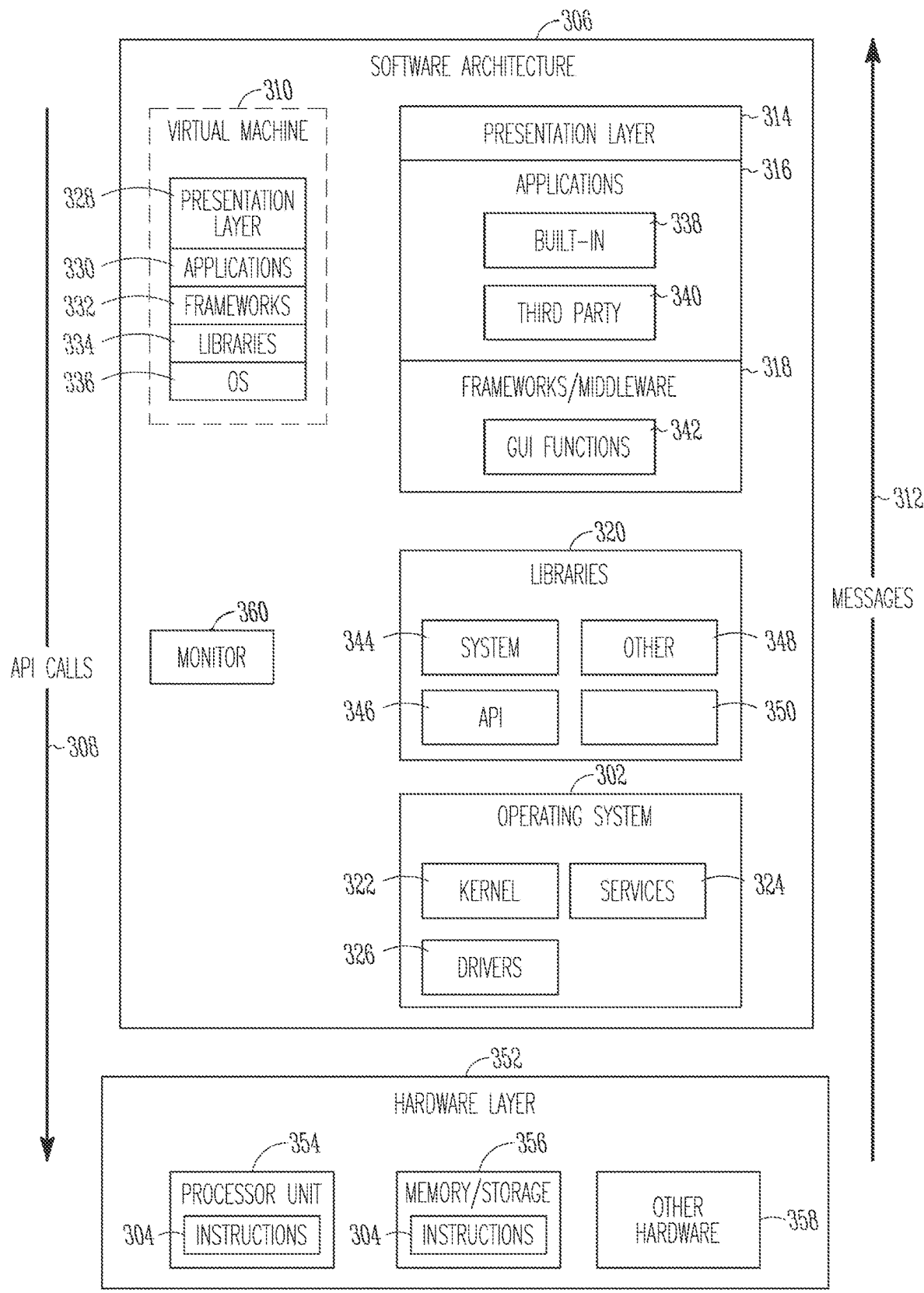
FIG. 3 is a block diagram illustrating a representative software architecture, which may be used in conjunction with various hardware architectures herein described.

FIG. 3 is a block diagram illustrating an example software architecture 306, which may be used in conjunction with various hardware architectures herein described. FIG. 3 is a non-limiting example of a software architecture 306 and it will be appreciated that many other architectures may be implemented to facilitate the functionality described herein. The software architecture 306 may execute on hardware such as machine 400 of FIG. 4 that includes, among other things, processors 404, memory/storage 406, and I/O components 418. A representative hardware layer 352 is illustrated and can represent, for example, the machine 400 of FIG. 4. The representative hardware layer 352 includes a processing unit 354 having associated executable instructions 304. Executable instructions 304 represent the executable instructions of the software architecture 306, including implementation of the methods, components and so forth described herein. The hardware layer 352 also includes memory and/or storage modules as memory/storage 356, which also have executable instructions 304. The hardware layer 352 may also comprise other hardware 358.

In the example architecture of FIG. 3, the software architecture 306 may be conceptualized as a stack of layers where each layer provides particular functionality. For example, the software architecture 306 may include layers such as an operating system 302, libraries 320, applications 316 and a presentation layer 314. Operationally, the applications 316 and/or other components within the layers may invoke application programming interface (API) API calls 308 through the software stack and receive a response as messages 312 in response to the API calls 308. The layers illustrated are representative in nature and not all software architectures have all layers. For example, some mobile or special purpose operating systems may not provide a frameworks/middleware 318, while others may provide such a layer. Other software architectures may include additional or different layers.

The operating system 302 may manage hardware resources and provide common services. The operating system 302 may include, for example, a kernel 322, services 324, and drivers 326. The kernel 322 may act as an abstraction layer between the hardware and the other software layers. For example, the kernel 322 may be responsible for memory management, processor management (e.g., scheduling), component management, networking, security settings, and so on. The services 324 may provide other common services for the other software layers. The drivers 326 are responsible for controlling or interfacing with the underlying hardware. For instance, the drivers 326 include display drivers, camera drivers, Bluetooth® drivers, flash memory drivers, serial communication drivers (e.g., Universal Serial Bus (USB) drivers), Wi-Fi® drivers, audio drivers, power management drivers, and so forth depending on the hardware configuration.

The libraries 320 provide a common infrastructure that is used by the applications 316 and/or other components and/or layers. The libraries 320 provide functionality that allows other software components to perform tasks in an easier fashion than to interface directly with the underlying operating system 302 functionality (e.g., kernel 322, services 324 and/or drivers 326). The libraries 320 may include system libraries 344 (e.g., C standard library) that may provide functions such as memory allocation functions, string manipulation functions, mathematical functions, and the like. In addition, the libraries 320 may include API libraries 346 such as media libraries (e.g., libraries to support presentation and manipulation of various media formats such as MPREG4, H.264, MP3, AAC, AMR, JPG, PNG), graphics libraries (e.g., an OpenGL framework that may be used to render 2D and 3D in a graphic content on a display), database libraries (e.g., SQLite that may provide various relational database functions), web libraries (e.g., WebKit that may provide web browsing functionality), and the like. The libraries 320 may also include a wide variety of other libraries 348 to provide many other APIs to the applications 316 and other software components/modules.

The frameworks/middleware 318 (also sometimes referred to as middleware) provide a higher-level common infrastructure that may be used by the applications 316 and/or other software components/modules. For example, the frameworks/middleware 318 may provide various graphic user interface (GUI) functions 342, high-level resource management, high-level location services, and so forth. The frameworks/middleware 318 may provide a broad spectrum of other APIs that may be utilized by the applications 316 and/or other software components/modules, some of which may be specific to a particular operating system or platform.

The applications 316 include built-in applications 338 and/or third-party applications 340. Examples of representative built-in applications 338 may include, but are not limited to, a contacts application, a browser application, a book reader application, a location application, a media application, a messaging application, and/or a game application. Third-party applications 340 may include any application developed using the ANDROID™ or IOS™ software development kit (SDK) by an entity other than the vendor of the particular platform, and may be mobile software running on a mobile operating system such as IOS™, ANDROID™, WINDOWS® Phone, or other mobile operating systems. The third-party applications 340 may invoke the API calls 308 provided by the mobile operating system (such as operating system 302) to facilitate functionality described herein.

The applications 316 may use built-in operating system functions (e.g., kernel 322, services 324 and/or drivers 326), libraries 320, and frameworks/middleware 318 to create user interfaces to interact with users of the system. Alternatively, or additionally, in some systems, interactions with a user may occur through a presentation layer, such as presentation layer 314. In these systems, the application/component "logic" can be separated from the aspects of the application/component that interact with a user.

Some software architectures use virtual machines. In the example of FIG. 3, this is illustrated by a virtual machine 310. The virtual machine 310 creates a software environment where applications/components can execute as if they were executing on a hardware machine (such as the machine 400 of FIG. 4, for example). The virtual machine 310 is hosted by a host operating system (operating system (OS) 336 in FIG. 3) and typically, although not always, has a virtual machine monitor 360, which manages the operation of the virtual machine 310 as well as the interface with the host operating system (i.e., operating system 302). A software architecture executes within the virtual machine 310 such as an operating system (OS) 336, libraries 334, frameworks 332, applications 330 and/or presentation layer 328. These layers of software architecture executing within the virtual machine 310 can be the same as corresponding layers previously described or may be different.

Figure 4:
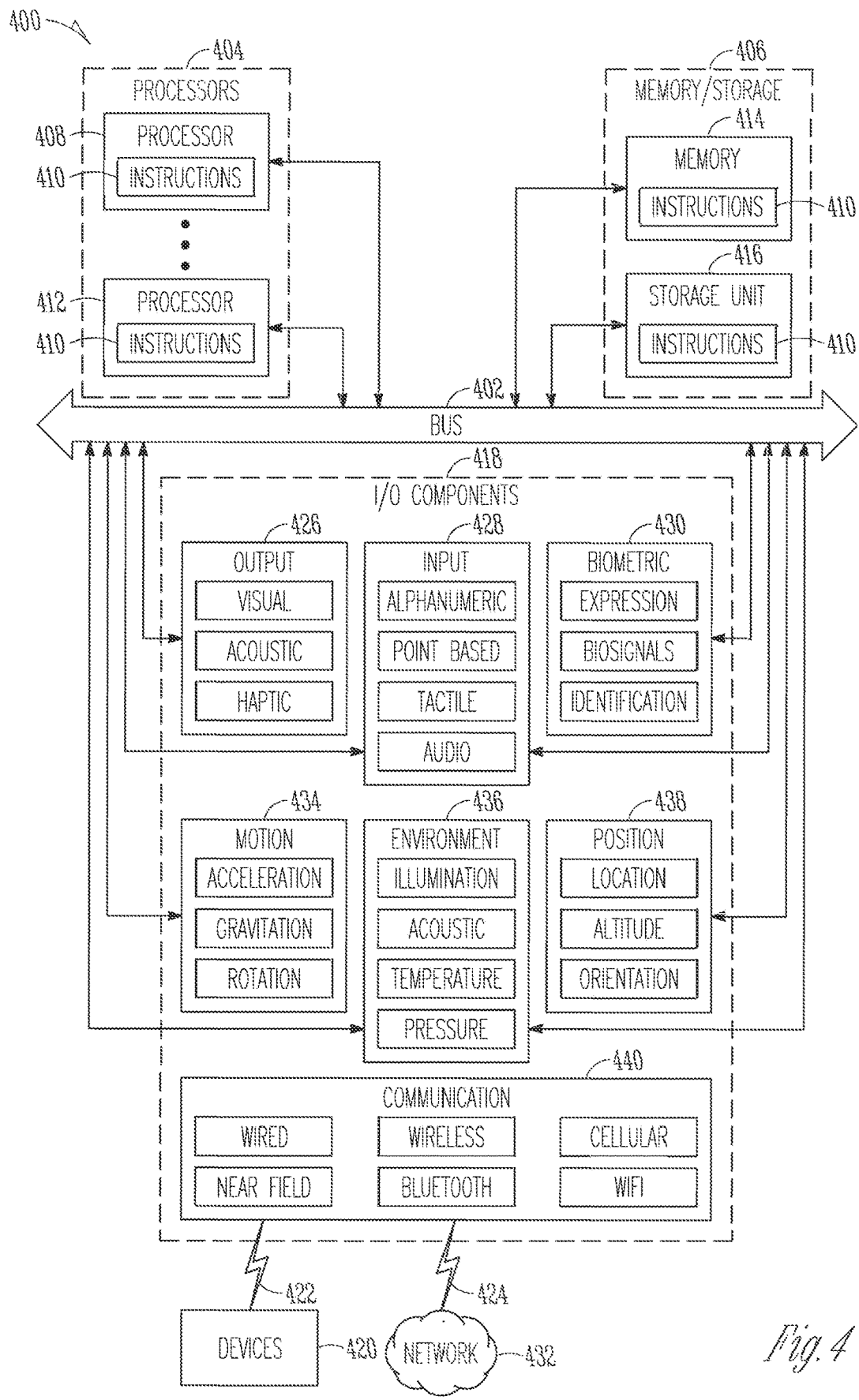
FIG. 4 is a block diagram illustrating components of a machine, according to some example embodiments, able to read instructions from a machine-readable medium (e.g., a machine-readable storage medium) and perform any one or more of the methodologies discussed herein.

FIG. 4 is a block diagram illustrating components of a machine 400, according to some example embodiments, able to read instructions from a machine-readable medium (e.g., a machine-readable storage medium) and perform any one or more of the methodologies discussed herein. Specifically, FIG. 4 shows a diagrammatic representation of the machine 400 in the example form of a computer system, within which instructions 410 (e.g., software, a program, an application, an applet, an app, or other executable code) for causing the machine 400 to perform any one or more of the methodologies discussed herein may be executed. As such, the instructions 410 may be used to implement modules or components described herein. The instructions 410 transform the general, non-programmed machine into a particular machine programmed to carry out the described and illustrated functions in the manner described. In alternative embodiments, the machine 400 operates as a standalone device or may be coupled (e.g., networked) to other machines. In a networked deployment, the machine 400 may operate in the capacity of a server machine or a client machine in a server-client network environment, or as a peer machine in a peer-to-peer (or distributed) network environment. The machine 400 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 410, sequentially or otherwise, that specify actions to be taken by machine 400. Further, while only a single machine 400 is illustrated, the term "machine" shall also be taken to include a collection of machines that individually or jointly execute the instructions 410 to perform any one or more of the methodologies discussed herein.

The machine 400 may include processors 404, memory/storage 406, and I/O components 418, which may be configured to communicate with each other such as via a bus 402. The memory/storage 406 may include a memory 414, such as a main memory, or other memory storage, and a storage unit 416, both accessible to the processors 404 such as via the bus 402. The storage unit 416 and memory 414 store the instructions 410 embodying any one or more of the methodologies or functions described herein. The instructions 410 may also reside, completely or partially, within the memory 414, within the storage unit 416, within at least one of the processors 404 (e.g., within the processor's cache memory), or any suitable combination thereof, during execution thereof by the machine 400. Accordingly, the memory 414, the storage unit 416, and the memory of processors 404 are examples of machine-readable media.

The I/O components 418 may include a wide variety of components to receive input, provide output, produce output, transmit information, exchange information, capture measurements, and so on. The specific I/O components 418 that are included in a particular machine will depend on the type of machine. For example, portable machines such as mobile phones will likely include a touch input device or other such input mechanisms, while a headless server machine will likely not include such a touch input device. It will be appreciated that the I/O components 418 may include many other components that are not shown in FIG. 4. The I/O components 418 are grouped according to functionality merely for simplifying the following discussion and the grouping is in no way limiting. In various example embodiments, the I/O components 418 may include output components 426 and input components 428. The output components 426 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 428 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or other pointing instrument), tactile input components (e.g., a physical button, a touch screen that provides location and/or force of touches or touch gestures, or other tactile input components), audio input components (e.g., a microphone), and the like.

In further example embodiments, the I/O components 418 may include biometric components 430, motion components 434, environment components 436, or position components 438 among a wide array of other components. For example, the biometric components 430 may include components to detect expressions (e.g., hand expressions, facial expressions, vocal expressions, body gestures, or eye tracking), measure bio signals (e.g., blood pressure, heart rate, body temperature, perspiration, or brain waves), identify a person (e.g., voice identification, retinal identification, facial identification, fingerprint identification, or electroencephalogram based identification), and the like. The motion components 434 may include acceleration sensor components (e.g., accelerometer), gravitation sensor components, rotation sensor components (e.g., gyroscope), and so forth. The environment components 436 may include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment. The position components 438 may include location sensor components (e.g., a Global Position System (GPS) receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 418 may include communication components 440 operable to couple the machine 400 to a network 432 or devices 420 via coupling 424 and coupling 422, respectively. For example, the communication components 440 may include a network interface component or other suitable device to interface with the network 432. In further examples, communication components 440 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 420 may be another machine or any of a wide variety of peripheral devices (e.g., a peripheral device coupled via a Universal Serial Bus (USB)).

Moreover, the communication components 440 may detect identifiers or include components operable to detect identifiers. For example, the communication components 440 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 440, such as location via Internet Protocol (IP) geo-location, location via Wi-Fi® signal triangulation, location via detecting an NFC beacon signal that may indicate a particular location, and so forth.

In some embodiments, a JavaScript library (such as Stripe.js) can be wired into a merchant's checkout form to handle credit card information. When a user attempts to complete a transaction using the checkout form, it sends the credit card information directly from the user's browser to Stripe's servers. Stripe.js provides merchants with a set of technologies that can be easily and quickly integrated to securely accept payments online. With Stripe.js, merchants retain full control of their customers' payment flows, but their servers are never exposed to sensitive payment information.

When added to a merchant's payment form, Stripe.js automatically intercepts the payment form submission, sending payment information directly to Stripe and converting it to a Single-use Token. The Single-use Token can be safely passed to the merchant's systems and used later to charge customers. Merchants have complete control of their customers' payment experience without ever handling, processing, or storing sensitive payment information.

Figure 5:
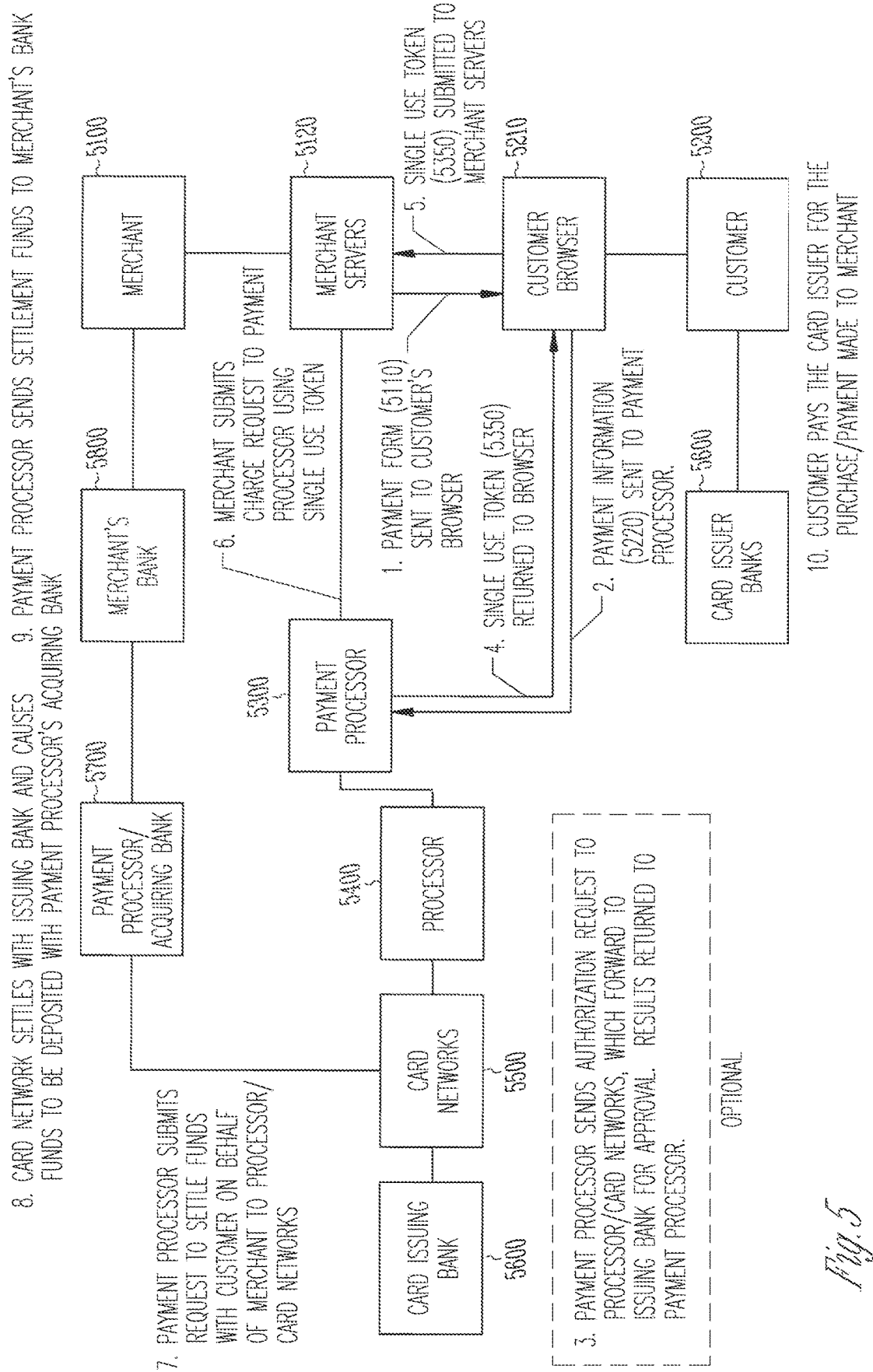
FIG. 5 is a block diagram showing aspects of an online method for conducting a transaction between a merchant site and an electronic user device using a payment processor, according to an example embodiment.

Viewed broadly in one example, and with reference to FIG. 5, Stripe.js works as follows:

1. The Merchant's Customer (5200) uses an internet-enabled browser (5210) to visit the Merchant's site. Customer is served a Stripe.js enabled Payment Form (5110) using standard web technologies. The Customer (5200) enters the specified information including their Payment Information (5220) and submits the Payment Form (5110). The Billing Info portion of the Payment Form (5110) is for payment via a credit card or debit card. If payment is to be made via an Automated Clearinghouse (ACH) transaction, the Billing Info portion of the Payment Form (5110) will request a bank routing number and an account number within that bank, and possibly additional information, such as the bank name and whether the account is a checking or savings account.

2. The Customer's payment information (5220) is sent from the Customer's browser (5210) to Stripe (5300), never touching the Merchant's Servers (5120). In this manner, the client-side application electronically sends payment information retrieved from the customer's electronic device to the payment processor. The client-side application does not send the payment information (5220) to the server-side application.

3. In one preferred embodiment, Stripe (5300) submits the relevant transaction to a Processor (5400) or directly to the Card Network (5500) for authorization or validation of the payment information. The Card Network (5500) sends the request to the Card Issuing Bank (5600), which authorizes the transaction. In this embodiment, Stripe (5300) and Processor (5400)/Card Network (5500) function together as a payment processor. In another example embodiment, this step is performed without any communication to the Processor (5400)/Card Network (5500). Instead, Stripe (5300) performs its own authorization or validation of the payment information using heuristic means, such as by checking the Bank Identification Number (BIN), also referred to as the Issuer Identification Number (IIN), against a database of known, valid BINS that is on file with Stripe (5300). (The BIN is a part of the bank card number, namely the first six digits.) In yet another example embodiment, this step is not performed at all since the authorization or validation is not necessary for the next step (4) to succeed. That is, it is acceptable to create a Single-use Token in step (4) that represents payment information which has not been validated in any way.

4. If authorized, Stripe (5300) will generate and return a secure, Single-use Token (5350) to the Customer's Browser (5210) that represents the customer's payment information (220) but doesn't leak any sensitive information. In the example embodiment wherein step (3) is not performed, Stripe (5300) performs this step without waiting to receive authorization from the Processor (5400) or the Card Network (5500). In this manner, the payment processor (here, Stripe (5300)) creates the Token (5350) from the payment information sent by the client-side application, wherein the Token (5350) functions as a proxy for the payment information (5220).

5. The Payment Form (5110) is submitted to Merchant Servers (5120), including the Single-use Token (5350). More specifically, the payment processor sends the Token (5350) to the client-side application, which, in turn, sends the Token (5350) to the server-side application for use by the server-side application in conducting the transaction.

6. The Merchant (5100) uses the Single-use Token (5350) to submit a charge request to Stripe (5300) (or to create a Customer object for later use). In this step, Stripe (5300) submits a request to authorize the charge to the Processor (5400) or directly to the Card Network (5500). This authorization specifies the actual amount to charge the credit card. If an authorization was already done in step (3) for the correct amount, this authorization request can be skipped. This may be a one-time payment for a merchant item, or it may involve registering the payment information with the merchant site for subsequent use in making a payment for a merchant item (so-called "card on file" scenario). Using the process described in steps (1) through (6), the payment information can be used by the server-side application via the Token (5350) without the server-side application being exposed to the payment information.

7. Stripe (5300) settles the charge on behalf of the Merchant (5100) with the Processor (5400) or directly with the Card Network (5500).

8. The Card Network (5500) causes the funds to be paid by the Card Issuing Bank (5600) to Stripe (5300) or to Stripe's Acquiring Bank (5700).

9. Stripe (5300) causes the settled funds to be sent to the Merchant (100) (or to the Merchant's Bank (5800)), net of any applicable fees.

10. The Card Issuing Bank (5600) collects the paid funds from the Customer (5200).

Not all of the steps listed above need happen in real time. Other examples, arrangements and functionality are possible. Applicant's published patent application US 2013/0117185 A1 is incorporated by reference in its entirety in this regard. Typically, when the Merchant's Customer submits the payment form in step (1), steps (1) through (6) happen in real time and steps (7) through (10) happen later, usually once per day, as a batch process settling all of the funds for all of Stripe's merchants. In some examples, the payment processor uses an http-based tokenization API for use in steps (2) and (4) above. Some broader examples may be considered as "tokenization as a service" in which any data is tokenized. One general example may facilitate a merger and acquisition (M&A) analysis in which companies want to compare an overlap in their customer base with another. A payment processor (acting as a tokenization service) can tokenize the customers of each company and compare the overlap without revealing confidential information to either party. Unique payment tokens can be adapted to enable and facilitate such a tokenization service.

As mentioned above, while payment processors seek to provide continuous uptime and availability, the reality is that there are occasionally periods ranging from seconds to minutes when technical problems exist, such as service interruptions. Such technical interruptions can be caused for example by the service itself, or by network connectivity issues (e.g., DNS routing problems, server crash, malware), or because of the temporary unavailability of a third party upon which the payment processor relies. For online or standard retail merchants using payment processors, this offline period can be problematic because they are generally unable to accept any payments, resulting in potential lost sales or customer frustration.

More specifically, the client-side application receiving the sensitive, payment information cannot send it to the payment processor because the payment processor is down (unavailable or cannot be reached), yet the merchant's server-side application cannot at the same time be exposed to sensitive payment information. So, this information needs to be secured in a manner that permits it to reside on the merchant's servers until the payment processor is back online, and such that the payment processor is able to confirm the validity of the information once finally received.

In embodiments, these problems can be addressed through a technically improved system that can automatically deploy an offline mode for merchants that enables them to continue to receive payments from customers during payment processor service interruptions, whether online (e-commerce), mobile, or card present.

In certain aspects, the system relies on ephemeral keys that enable the user to capture payment information (e.g., cardholder data) and provide it to the payment processor in a time-limited manner while still complying with PCI requirements. That is, the system can decouple the way a merchant user accepts payment information and how the payment processor receives it.

Figure 6:
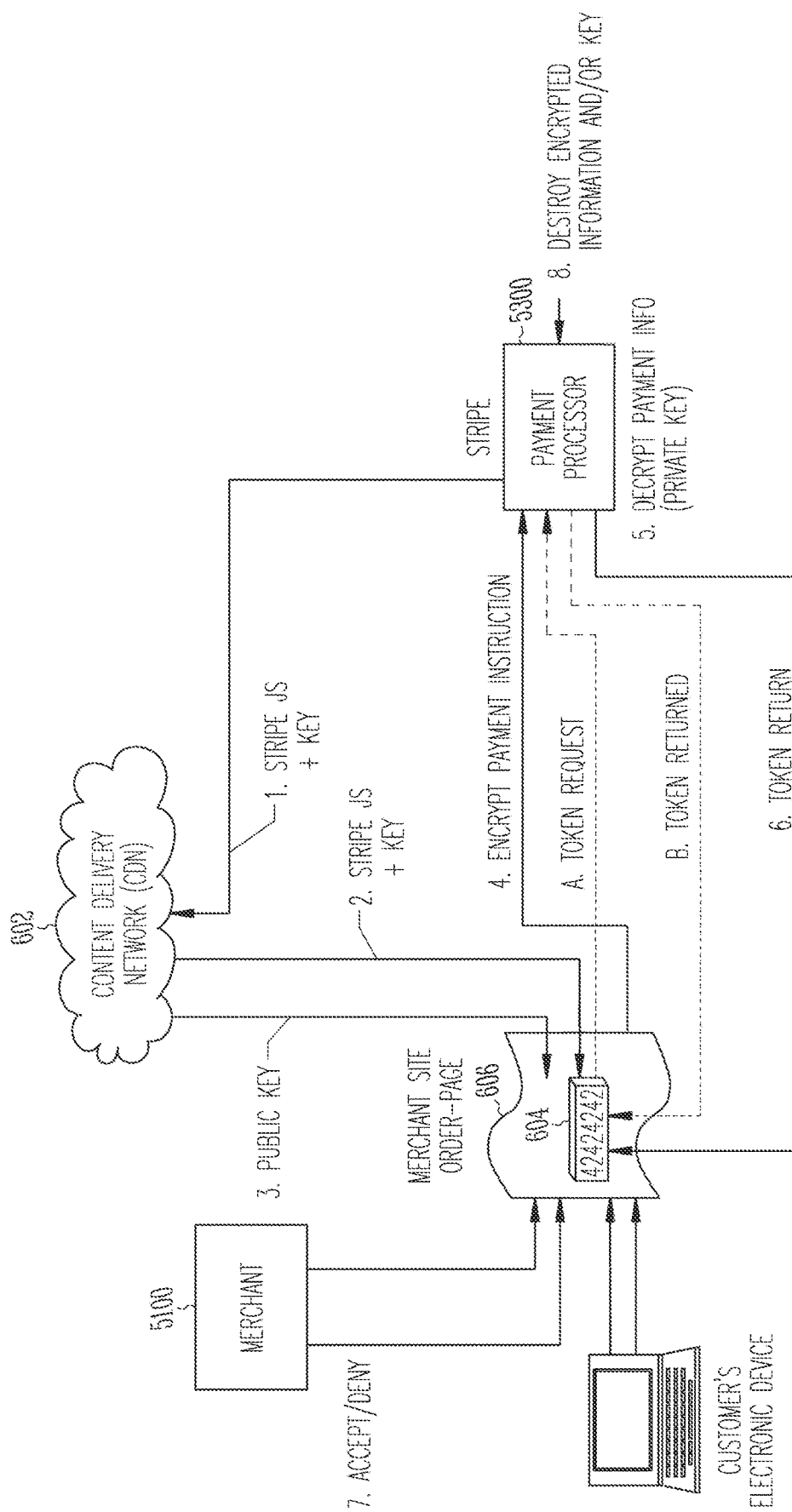
FIG. 6 is a pictorial view showing aspects of a method for conducting an offline transaction between a merchant site and an electronic user device using a payment processor, according to an example embodiment.

Using Stripe as an example implementation and with reference to FIG. 6, a script such as a JavaScript library (e.g., Stripe.js) can be sent (operation 1) to a merchant 5100 using a distributed server network or cloud-based delivery system, such as a content delivery network 602, (e.g., Fastly) (operation 2) that is separate from the payment processor 5300 (e.g., Stripe), such that the merchant 5100 can get access to Stripe.js even if the payment processor 5300 is offline. In another example, the merchant 5100 hosts stripe.js directly. In such outage conditions, the payment processor 5300 is unable to tokenize the payment information by the online method described further above, and shown again here in dotted outline by arrows marked A and B in FIG. 6, while the merchant 5100 is also unable to process payments based on payment information 604 submitted in an order page or payment form 606 on the merchant's website hosted by the merchant's server (120, not shown).

When offline, using the same content delivery network 602, the payment processor 5300 further provides in operation 1 (or at another time) an asymmetric (public) encryption key to the merchant 5100. In another example, the public key is provided by the content delivery network 602 instead of the payment processor 5300. That is, the content delivery network generates the public key (or keys) and sends the public key to the merchant 5100, and the private key to the payment processor 5300. In operation 3, the merchant 5100 (merchant server 120) can navigate to the content delivery network 602 to pull down the key. The merchant 5100 can encrypt it using the public key so that it can later be tokenized. The encrypted payload is then sent by the merchant 5100 to the payment processor (operation 4) through one attempt or repeated attempts until it is properly received (i.e., when the payment processor 300 is back online).

In some examples, the asymmetrical encryption keys are provided in different ways for different users. The same key is not provided for all users, nor are keys used for a long duration (e.g., more than 3 days). If a payment processor comes back online within that period, which almost certainly would occur, then the following further operations can occur in some examples.

As noted just previously, in operation 4 the merchant 5100 has sent the encrypted payment information to the payment processor 300. At this time the merchant 5100 (or whoever has actually stored the encrypted payment information, as in some examples this may not necessarily be the merchant) has no access to the data within the encrypted information. In operation 5, using a private key, the payment processor 300 decrypts the encrypted payment information. In operation 6, the payment processor 300 tokenizes the PAN (part of the payment information) and sends the token back to the merchant 5100, optionally with an authorization to accept or deny the customer's payment. This operation may be considered analogous to online operation B, but here an optional payment authorization option is provided.

In operation 7, the merchant 5100 can decide based on the information known about the customer and other information about the transaction (e.g., including attributes like the amount of the transaction, the location of the card country, whether the card was used a large number of times in the past day, etc.) whether or not to allow the payment to go through. In some examples, an "offline" indicator is provided to the merchant 5100 to alert the merchant that this mode was in use for a given transaction. This implies that an offline encryption method as opposed to an online tokenization method was used to protect the payment information associated with that transaction. If a given transaction relates to the delivery of highly valuable physical goods, for example, the merchant 5100 may decide to postpone delivery of the goods until the payment processor 300 is back online and the relevant token has been received. If, on the other hand, the transaction is time-sensitive—for example relating to a ride-share service (e.g., Uber)—the merchant may elect to render the ride-share service regardless of the offline status and the customer's payment information has remained encrypted notwithstanding. In either example, a business-based decision can be made and, more importantly, business can continue notwithstanding an outage on the payment processor side.

In some embodiments, in operation 8, the payment processor 300 destroys the received encrypted information after a period of time, for example three days if it has not been used by the merchant 5100. Alternatively, the payment processor 300 deletes their copy of the asymmetrical encryption key (i.e., the private key), rendering the encrypted information inaccessible.

Figure 7:
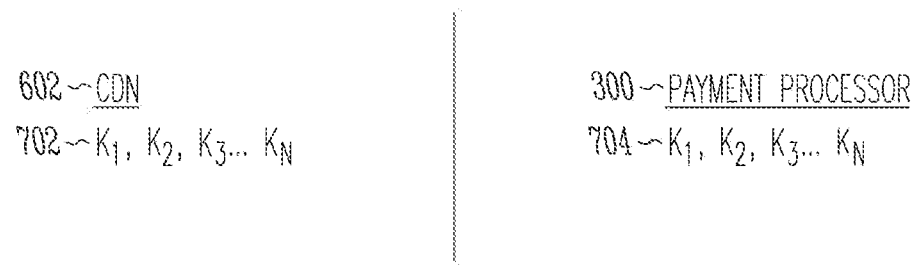
FIGS. 7-9 illustrate aspects of public-private key pairs, according to some example embodiments.

Referring now to FIG. 7, in some examples a random or dynamic set of public ($K_1$, $K_2$, $K_3$, ... $K_n$) and private ($K'_1$, $K'_2$, $K'_3$, ... $K'_n$) key pairs (702, 704, respectively) is utilized. In one example, the public key set can be provided or sent sequentially in random order, and at randomly timed periods, to the merchant 5100 (merchant server 120) via the content delivery network (CDN) 602 for encryption of payment information by the merchant 5100 as described above. Corresponding private keys are retained safely at the payment processor 300 for decryption and later destruction once used.

Figure 8:
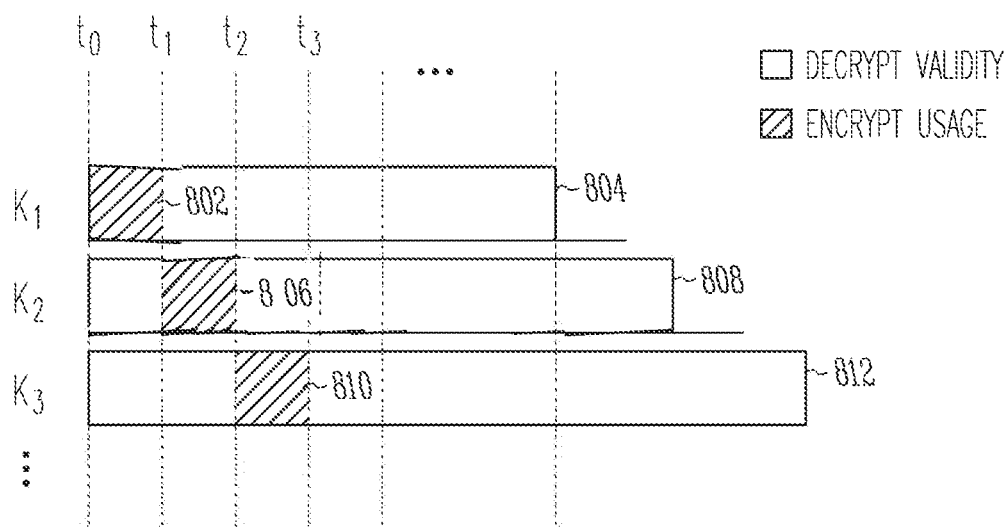

With reference to FIG. 8, a random set of public keys ($K_1$, $K_2$, $K_3$, ... $K_n$) with corresponding private keys is created at time zero ($t_0$). A first of the key pairs is enabled with an encryption usage period of the public key between ($t_0$) and ($t_1$), and a decryption usage period of the private key expiring at a later designated time at 804. Outside of these times, this key pair is useless to both merchant 5100 and payment processor 300 for encryption/decryption purposes, and indeed useless to the customer or a bad actor seeking to misappropriate or decrypt the payment information. Similarly, random encryption usage periods and decryption expiry times can be provided for subsequent key pairs $K_2$ and $K_3$, at 806 and 808, and 810 and 812, respectively. The encryption and decryption time periods may be tightened up or relaxed accordingly based on an assessed importance of the payment or sensitive information being protected. For example, some payment information includes PAN data, CVV2/CVC2/CID data, PIN or block data, or magnetic stripe equivalent data. Other examples may include bank account and routing numbers, or country-specific payment data. Other sensitive information may include fraud signals, such as browse data, device data, and velocity checks.

Figure 9:

In some examples, for example as shown in FIG. 9, a series 900 of sequential key pairs, as well as the associated encryption usage periods and expiry times, can all be set at non-regular intervals.

Thus, in some example use cases of the present methods, service providers can accept many different types of regulated data. In one example, a medical provider (for example, a doctor or wellness center) can conveniently enable a user (for example, a patient) to enter blood glucose level information on a regular basis (for example, daily) using an app or online method described herein, as opposed to requiring the patient to call or walk in and notify their doctor. In another example, a patient can use the methods described herein to send blood lab results to a hospital. Thus, as indicated further above, the term "payment information" in the present context can include within its scope not just PCI information but also other confidential information, for example that which could fall under HIPAA requirements. For example, in a medical use case, a provider such as OneMedical uses a unique data entry form within their app to collect data from their customers.

In one example, a patient may use an internet-enabled browser (or app) to visit the website (or app platform) of a health care provider (e.g., a doctor, as referred to for example in the description below) having associated client-side and server-side applications. The patient is served a script-enabled submission form using standard web technologies. The script may be provided by or sourced from an information-processor in analogous way to the methods pertaining to the payment processor described elsewhere herein.

The patient enters the specified information including for example sensitive medical or personal information and submits the completed form. In one example, the form includes a billing info portion for effecting payment for services via a credit card or debit card. In these examples, the form may thus contain sensitive personal or medical information, as well as sensitive payment information.

The patient's sensitive personal, medical and/or payment information is sent from the patient's browser to the information-processor, never touching the doctor's server. In this manner, a client-side application electronically sends any sensitive information retrieved from the patient's electronic device to the information-processor. The client-side application does not send any sensitive information to the server-side application.

Upon receipt of the patient's sensitive information, the information-processor generates and returns a token, for example a secure, Single-use Token to the patient's browser that represents the patient's sensitive information. In one example, the information-processor creates the token from the sensitive information sent by the client-side application, and the token functions as a proxy for the sensitive information.

The submission form is submitted to the doctor's server, including the token. More specifically, the information-processor sends the token to the client-side application, which, in turn, sends the token to the server-side application for use by the server-side application in conducting the submission.

In some examples, the patient's sensitive information may be stored at the information-processor with no further action taken by the doctor, who is held harmless from it. The information may be later retrieved by the patient, or retrieved by authorizing the doctor, using the token.

In other examples, the doctor uses the token to submit a charge request to the information-processor. In this step, the information-processor submits a request to authorize the charge to a payment source. This authorization specifies the actual amount to charge to a payment card or account. Using the process described above, the sensitive personal, medical or payment information can be used by the server-side application via the token without the server-side application being exposed to the sensitive information.

Thus, in some embodiments, there is provided a payment processor for conducting a transaction between a merchant site including a web page and an electronic user device using the payment processor, the merchant site hosted on a merchant site server and associated with a client side application and a server-side application for hosting the merchant site, wherein the client-side application executes on the electronic user device, the system comprising: a network; processors; and a memory storing instructions that, when executed by at least one processor among the processors, cause the scheduling system to perform operations comprising, at least: detecting an online status at the payment processor; receiving, at the payment processor, payment information sent electronically from the client-side application executing on the electronic user device; creating a token for the payment information sent by the client-side application, the token functioning as a proxy for the payment information; electronically sending the token to the client-side application, the client-side application electronically sending the token to the server-side application for conducting the transaction without the server-side application being exposed to the payment information; detecting an offline status at the payment processor; identifying a distributed server network; providing at least a public key to the merchant site server via the distributed server network for encrypting the payment information; and receiving, when back online, the encrypted payment information sent from the client-side application. The operations may comprise further steps as described below, or elsewhere herein.

Some embodiments of the present inventive subject matter include methods for conducting, at a payment processor, a transaction between a merchant site and an electronic user device using the payment processor, the merchant site hosted on a merchant site server and associated with a client side application and a server-side application, wherein the client-side application executes on the electronic user device.

Figure 10:
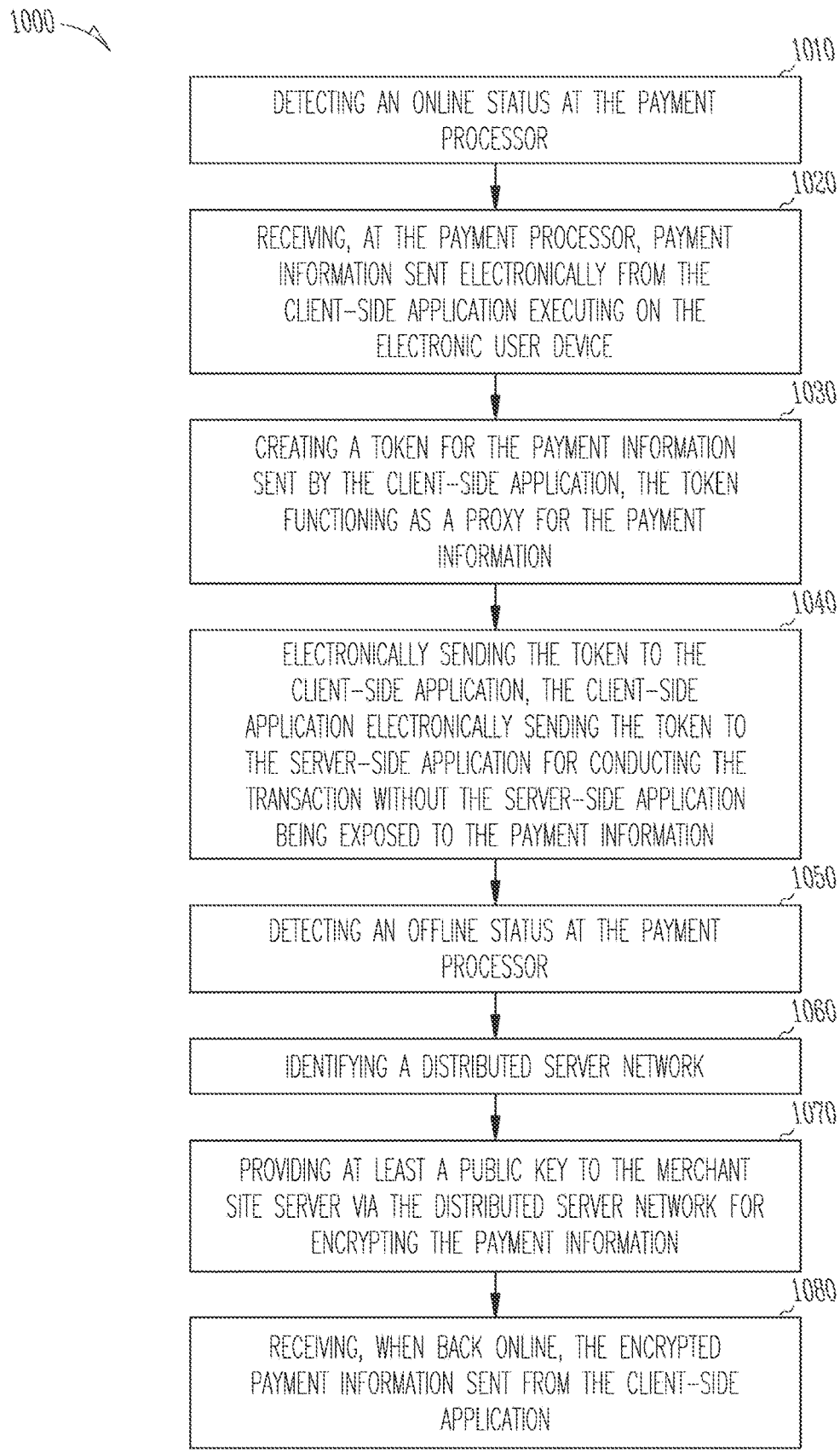
FIG. 10 is a flowchart for a method for conducting an offline transaction between a merchant site and an electronic user device using a payment processor, according to an example embodiment.

With reference to FIG. 10, one such method 1000 comprises, at operation 1010, detecting an online status at the payment processor; at operation 1020, receiving, at the payment processor, payment information sent electronically from the client-side application executing on the electronic user device; at operation 1030, creating a token for the payment information sent by the client-side application, the token functioning as a proxy for the payment information; at operation 1040, electronically sending the token to the client-side application, the client-side application electronically sending the token to the server-side application for conducting the transaction without the server-side application being exposed to the payment information; at operation 1050, detecting an offline status at the payment processor; at operation 1060, identifying a distributed server network; at operation 1070, providing at least a public key to the merchant site server via the distributed server network for encrypting the payment information; and, at operation 1080, receiving, when back online, the encrypted payment information sent from the client-side application.

In some examples, the method 1000 further comprises providing, from the payment processor, a script to the merchant site server via the distributed server network, the script at least enabling encryption of the payment information by the merchant site server using the public key.

In some examples, the method 1000 further comprises at the payment processor, decrypting the received encrypted payment information sent from the client-side application.

In some examples, the method 1000 further comprises, in response to receiving the encrypted payment information sent from the client-side application when online, or decrypting the encrypted payment information received from the client-side application, creating a token for the payment information, the token functioning as a proxy for the payment information; and electronically sending the token to the client-side application, the client-side application electronically sending the token to the server-side application for conducting the transaction without the server-side application being exposed to the payment information.

In some examples, the method 1000 further comprises randomly generating dynamic public-private key pairs and sourcing the public key, provided to the merchant site server via the content delivery network, from the randomly generated dynamic public-private key pairs.

In some examples, the method 1000 further comprises assigning or enabling an encryption usage period and a decryption expiry time to each of the public-private key pairs.

In some examples, a method, at an information-processor, is provided for conducting a submission of sensitive information to a service-provider site from an electronic user device using the information-processor, the service-provider site hosted on a service-provider site server and associated with a client-side application and a server-side application, wherein the client-side application executes on the electronic user device, the method comprising detecting an online status at the information-processor; receiving, at the information-processor, sensitive information sent electronically from the client-side application executing on the electronic user device; creating a token for the sensitive information sent by the client-side application, the token functioning as a proxy for the sensitive information; electronically sending the token to the client-side application, the client-side application electronically sending the token to the server-side application for conducting the submission of sensitive information without the server-side application being exposed to the sensitive information; detecting an offline status at the information-processor; identifying a distributed server network; providing at least a public key to the service-provider site server via the distributed server network for encrypting the sensitive information; and receiving, when back online, the encrypted sensitive information sent from the client-side application.

In some examples, the method further comprises providing, from the information-processor, a script to the service-provider site server via the distributed server network, the script at least enabling encryption of the sensitive information by the service-provider site server using the public key. In some examples, the method further comprises one or more of the operations discussed further above.

Some embodiments include machine-readable media including instructions which, when read by a machine, cause the machine to perform the operations of any one or more of the methodologies summarized above, or described elsewhere herein.

Although the subject matter has been described with reference to specific example embodiments, it will be evident that various modifications and changes may be made to these embodiments without departing from the broader spirit and scope of the disclosed subject matter. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Description, therefore, is not to be taken in a limiting sense, and the scope of various embodiments is defined only by any appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

What is claimed is:

1. A method comprising:
    receiving, by a user device and from a server side application, a first script for performing a first secure operation with the server side application with facilitation from a service provider server, the first script comprising a first public key obtained from a key distribution server; and
    executing, by the user device, the first script to perform the first secure operation, the executing comprising:
        determining, by the user device, whether the service provider server is unavailable to facilitate the first secure operation; and
        in response to determining, by the user device, that the service provider server is unavailable to perform the first secure operation:
            encrypting, by the user device and using the first public key, first private information to facilitate the first secure operation; and
            transmitting, by the user device, the encrypted first private information to the server side application;
    receiving, by the user device and from the server side application, a second script for performing a second secure operation with the server side application with facilitation from the service provider server, the second script comprising a second public key obtained from the key distribution server; and
    executing, by the user device, the second script to perform the second secure operation, the executing comprising:
        determining, by the user device, whether the service provider server is available to facilitate the second secure operation; and
        in response to determining, by the user device, that the service provider server is available to facilitate the second secure operation:

encrypting, with the second public key, second private information for performing the second secure operation;

transmitting the encrypted second private information to the service provider server;

receiving from the service provider server, a token derived from the second private information having been decrypted by the service provider server using a private key obtained from the key distribution server; and transmitting, to the server side application, the token in lieu of the second private information.

2. The method of claim 1, wherein obtaining the first public key from the key distribution server comprises:

receiving, by the user device and from the server side application, a form for user input, wherein the form includes an instruction to encrypt the first private information using the first public key.

3. The method of claim 2, wherein sending the token to the server side application comprises:

associating, by the user device, the token with the form; and submitting, by the user device and to the server side application, the form.

4. The method of claim 1, wherein the first public key, from the key distribution server, is sourced from a dynamic public-private key pair randomly generated by the service provider server.

5. The method of claim 4, wherein the dynamic public-private key pair is associated with an encryption usage period and a decryption expiry time, the decryption expiry time after an end of the encryption usage period.

6. The method of claim 1, further comprising receiving an offline mode indicator from the server side application and sending of the token is based on the offline mode indicator.

7. The method of claim 1, wherein:
the private information comprises a private key, and
the public key and the private key comprise ephemeral keys.

8. An electronic device comprising:
a memory; and
a processor configured to:
receive, from a server side application, a script for performing a secure operation with the server side application with facilitation from a service provider server, the script comprising a public key obtained from a key distribution server; and
execute the script to perform the secure operation, the executing comprising:
determine whether the service provider server is unavailable to facilitate the secure operation;
in response to a first determination that the service provider server is unavailable to perform the secure operation:
encrypt private information using the public key to facilitate the secure operation; and
transmit the encrypted private information to the server side application; and
in response to a second determination that the service provider server is available to facilitate the secure operation:
encrypt, with the public key, private information for performing the secure operation;
transmit the encrypted private information to the service provider server;
receive from the service provider server, a token derived from the private information having been decrypted by the service provider server using a private key obtained from the key distribution server; and
transmitting, to the server side application, the token in lieu of the private information.

9. The electronic device of claim 8, wherein the processor is configured to obtain the public key from the key distribution server by:

receiving from the server side application, a form for user input, wherein the form includes an instruction to encrypt the private information using the public key.

10. The electronic device of claim 9, wherein the processor is configured to send the token to the server side application by:

associating the token with the form; and
submitting to the server side application, the form.

11. The electronic device of claim 8, wherein the public key, from the key distribution server, is sourced from a dynamic public-private key pair randomly generated by the service provider server.

12. The electronic device of claim 11, wherein the dynamic public-private key pair is associated with an encryption usage period and a decryption expiry time, the decryption expiry time after an end of the encryption usage period.

13. The electronic device of claim 8, wherein the processor is further configured to receive an offline mode indicator from the server side application and sending of the token is based on the offline mode indicator.

14. The electronic device of claim 8, wherein:
the private information comprises a private key, and
the public key and the private key comprise ephemeral keys.

15. A non-transitory computer-readable medium comprising:

computer-readable instructions that, when executed by a processor, cause the processor to perform one or more operations comprising:

receiving, by a user device and from a server side application, a script for performing a secure operation with the server side application with facilitation from a service provider server, the script comprising a public key obtained from a key distribution server;

executing, by the user device, the script to perform the secure operation, the executing comprising:

determining, by the user device, whether the service provider server is unavailable to facilitate the secure operation;

in response to determining, by the user device, that the service provider server is unavailable to facilitate the secure operation:

encrypting, by the user device and using the public key, private information for performing the secure operation;

transmitting, by the user device, the encrypted private information to the server side application; and in response to determining that the service provider server is available to facilitate the secure operation:

encrypting, with the public key, private information for performing the secure operation;

transmitting the encrypted private information to the service provider server;

receiving from the service provider server, a token derived from the private information having been decrypted by the service provider server using a private key obtained from the key distribution server; and transmitting, to the server side application, the token in lieu of the private information.

16. The non-transitory computer-readable medium of claim 15, wherein obtaining the public key from the key distribution server comprises:

receiving, by the user device and from the server side application, a form for user input, wherein the form includes an instruction to encrypt the private information using the public key.

17. The non-transitory computer-readable medium of claim 16, wherein sending the token to the server side application comprises:

associating, by the user device, the token with the form; and submitting, by the user device and to the server side application, the form.

18. The non-transitory computer-readable medium of claim 15, wherein the public key, from the key distribution server, is sourced from a dynamic public-private key pair randomly generated by the service provider server.

19. The non-transitory computer-readable medium of claim 18, wherein the dynamic public-private key pair is associated with an encryption usage period and a decryption expiry time, the decryption expiry time after an end of the encryption usage period.

20. The non-transitory computer-readable medium of claim 15, wherein:

the private information comprises a private key, and the public key and the private key comprise ephemeral keys.

* * * * *